(12) United States Patent
Ogawa et al.

(10) Patent No.: US 6,641,204 B2
(45) Date of Patent: Nov. 4, 2003

(54) MOLDING ATTACHMENT STRUCTURE FOR AUTOMOBILE DOOR

(75) Inventors: Takashi Ogawa, Wako (JP); Mikio Suzuki, Wako (JP); Takeshi Yamamoto, Wako (JP); Takashi Yamanaka, Tokyo (JP); Hideaki Sugimoto, Tokyo (JP); Kazunari Iida, Tokyo (JP)

(73) Assignees: Honda Giken Kogyo Kabushiki Kaisha, Tokyo (JP); Sankei Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/233,084

(22) Filed: Aug. 30, 2002

(65) Prior Publication Data

US 2003/0042756 A1 Mar. 6, 2003

(30) Foreign Application Priority Data

Sep. 4, 2001 (JP) ........................................ 2001-266689

(51) Int. Cl.⁷ .................................................. B60J 5/04
(52) U.S. Cl. ................................ 296/146.9; 296/146.2; 296/93; 49/489.1
(58) Field of Search ............................ 296/146.9, 146.5, 296/146.2, 146.1, 146.15, 146.16, 93; 49/489.1, 490.1

(56) References Cited

U.S. PATENT DOCUMENTS

| 5,072,545 A | * | 12/1991 | Nozaki ....................... 49/490.1 |
| 5,356,194 A | * | 10/1994 | Takeuchi ................... 296/146.9 |
| 5,424,019 A | * | 6/1995 | Miyakawa et al. ...... 264/177.17 |
| 5,992,021 A | * | 11/1999 | Takeda et al. .............. 29/897.2 |
| 6,007,140 A | * | 12/1999 | Heitmann et al. ........ 296/146.9 |
| 6,099,068 A | * | 8/2000 | Kim .......................... 296/146.9 |
| 6,131,342 A | * | 10/2000 | Miyamoto et al. .......... 49/484.1 |
| 6,409,251 B1 | * | 6/2002 | Kaye et al. ............... 296/146.9 |
| 2001/0015035 A1 | * | 8/2001 | Nozaki .......................... 49/440 |
| 2003/0071482 A1 | * | 4/2003 | Shimizu ................... 296/146.9 |

FOREIGN PATENT DOCUMENTS

JP 11059185 3/1999

* cited by examiner

*Primary Examiner*—Joseph D. Pape
*Assistant Examiner*—Patricia Engle
(74) *Attorney, Agent, or Firm*—Merchant & Gould, P.C.

(57) ABSTRACT

A molding attaching structure includes a sash provided on an automobile door, an outer sash mounted to the sash, and a molding mounted to the outer sash. When a door glass of the door is fully closed, the molding has its one side end laid over an edge of the door glass. The molding has its outer surface substantially flush with an outer surface of an automobile body. The outer sash includes a molding attachment part projecting outwardly therefrom. The molding attachment part includes an extension part and an edge part. The edge part includes a first portion extending from the extension part away from the door glass and having a distal end bent back, and a second portion extending from the distal end across the extension part towards the door glass.

7 Claims, 8 Drawing Sheets

MOLDING ATTACHMENT STRUCTURE FOR AUTOMOBILE DOOR

FIELD OF THE INVENTION

The present invention relates to a molding attachment structure for an automobile door.

BACKGROUND OF THE INVENTION

Known automobile doors include door inner panels and sashes provided on upper parts of the door inner panels. The sashes each have an outer sash provided externally thereof. Each sash has a door glass mounted therein. The door glass is movable up and down within the sash. Generally, the sashes have moldings attached to outer edges thereof for the purpose of decoration. Structures for attaching such moldings to the sashes are disclosed in Japanese Patent Laid-Open Publication No. HEI 11-59185, for example.

The disclosed sash of an automobile door includes an inner sash portion of generally U-shaped cross-section. The inner sash portion is opened outwardly of an automobile body. An outer roof panel is joined to the inner sash portion to close the opening of the inner sash portion. The outer roof panel has a molding fitted part formed integrally therewith. The molding fitted part is T-shaped in cross-section and extends outwardly from the outer roof panel. A molding is attached to the molding fitted part from outside the automobile body. The molding has its outer surface substantially flush with an outer surface of the automobile body. The outer surface of the molding is spaced from an outer surface of a door glass of the automobile door by a relatively large distance.

Recently, there has been increased need to make the distance between the molding and the door glass as small as possible.

For some automobile, when a door glass of an automobile door is in a closed position, a molding of the door has its one side edge lying over one edge of the door glass. In order that while the automobile runs, the automobile door undergoes a less air resistance to produce a reduced hiss in addition to providing an improved outer appearance thereof, it is required: (1) that the molding have its outer surface substantially flush with an outer surface of an automobile body; and (2) that the outer surface of the molding be spaced from an outer surface of the door glass by a small distance.

For the automobile door disclosed in the aforementioned publication, however, the molding does not have its one side edge lying over an edge of the door glass when the door glass is in a closed position. Even if the door glass in the closed position had the edge underlying the side edge of the molding, the distance between the outer surface of the molding and the outer surface of the door glass would not be readily rendered small. The reason the distance is shortened with difficulty is as follows.

The molding fitted part includes an extension portion extending to outside the automobile body and an edge portion extending perpendicularly to the extension portion to provide a T-shaped cross-section. More specifically, the molding fitted part is made by folding a single sheet in two. In other words, both the extension portion and the edge portion are double-layered. This means that the edge portion has its thickness corresponding to that of the sheet folded in two. The molding is made from rubber or synthetic resin to thereby provide a larger thickness. Therefore, the distance between the outer surface of the molding and the outer surface of the door glass can not be made smaller easily.

One may propose that a glass run channel for guiding the door glass from an opened position to the closed position or vice versa be reduced in width to shift the door glass outwardly for the purpose of reducing the distance between the outer surface of the molding and the outer surface of the door glass.

The width of the glass run channel can be reduced only a limited amount because: (1) the glass run channel should retain the door glass to ensure that the door glass moves between the opened position and the closed position; and (2) the glass run channel should maintain a sealing engagement with the door glass.

SUMMARY OF THE INVENTION

An object of the present invention is to provide a molding attachment structure including a molding attachment part for attaching a molding to a sash of an automobile door having a door glass mounted therein. When the door glass is in a fully closed position, the molding has one side edge lying over an edge of the door glass. This arrangement provides an improved outer appearance of the automobile. Moreover, while the automobile runs, the door undergoes a less air resistance to thereby produce a reduced hiss.

According to one aspect of the present invention, there is provided a molding attachment structure for a door of an automobile, comprising: (A) a sash to be provided on an upper part of a door inner panel of the door; (B) a door glass mounted in the sash; (C) an outer sash provided outside the sash; (D) a molding attachment part of T-shaped cross-section projecting outwardly from the outer sash; and (E) a molding mounted to an outer surface of the molding attachment part; the molding having an outer surface substantially flush with an outer surface of a body of the automobile, the molding having one side end lying over an edge of the door glass when the door glass is in a fully closed position; the molding attachment part comprising: (a) an extension part extending outwardly from the outer sash; and (b) an edge part including a first portion extending from a distal end of the extension part away from the door glass and having a distal end folded back, and a second portion extending from the folded distal end of the first portion across the extension part towards the door glass.

The automobile body has its outer surface substantially flush with the outer surface of the molding. The molding has its one side edge lying over the edge of the door glass. With this arrangement, while running, the automobile undergoes less air resistance, producing a reduced hiss. Additionally, the automobile provides an improved outer appearance thereof.

The edge part has its edge of single-layered structure providing a thickness corresponding to that of a single sheet. This leads to a reduced distance between an outer surface of the molding and an outer surface of the door glass. The thus arranged automobile provides the improved outer appearance thereof. Further, the automobile can run undergoing a reduced air resistance to thereby produce a less hiss.

In a preferred form of the present invention, the molding includes inwardly folded hook portions at opposite side edges thereof, the edge part having opposite side edges engaging the hook portions. Preferably, the molding attachment structure further comprises elastic members attached to the outer sash and the molding attachment part in such a manner as to press the hook portions against the opposite side edges of the second portion. Preferably, the elastic members are a glass run channel and a weatherstrip.

The elastic members force the hook portions against the opposite side edges to ensure that the molding is mounted to the molding attachment part.

In a further preferred form of the present invention, the edge part includes projecting portions provided proximate the opposite side edges of the second portion engaging the hook portions, the projecting portions being substantially flush with the hook portions of the molding and being forced against the elastic members.

The elastic members are pressed against the projecting portions as well as the hook portions. The molding is therefore reliably attached to the molding attachment part. The elastic members are in tight contact with the hook portions without any gap being formed there between. This results in the improved outer appearance of the automobile.

In a further preferred form of the present invention, the molding is formed of a metal sheet capable of reflecting light. Preferably, the metal sheet is made from a stainless steel.

The molding formed of a metal sheet can be thin. Use of the thin metal sheet helps reduce the distance between the outer surface of the molding and the outer surface of the door glass. Because the molding serves to reflect light, it can acts as a decoration to thereby provide the improved outer appearance of the automobile.

BRIEF DESCRIPTION OF THE DRAWINGS

A certain preferred embodiment of the present invention will hereinafter be described in detail, by way of example only, with reference to the accompanying drawings, in which.

DETAILED DESCRIPTION OF THE PREFERRED EMBODIMENT

Figure 1:
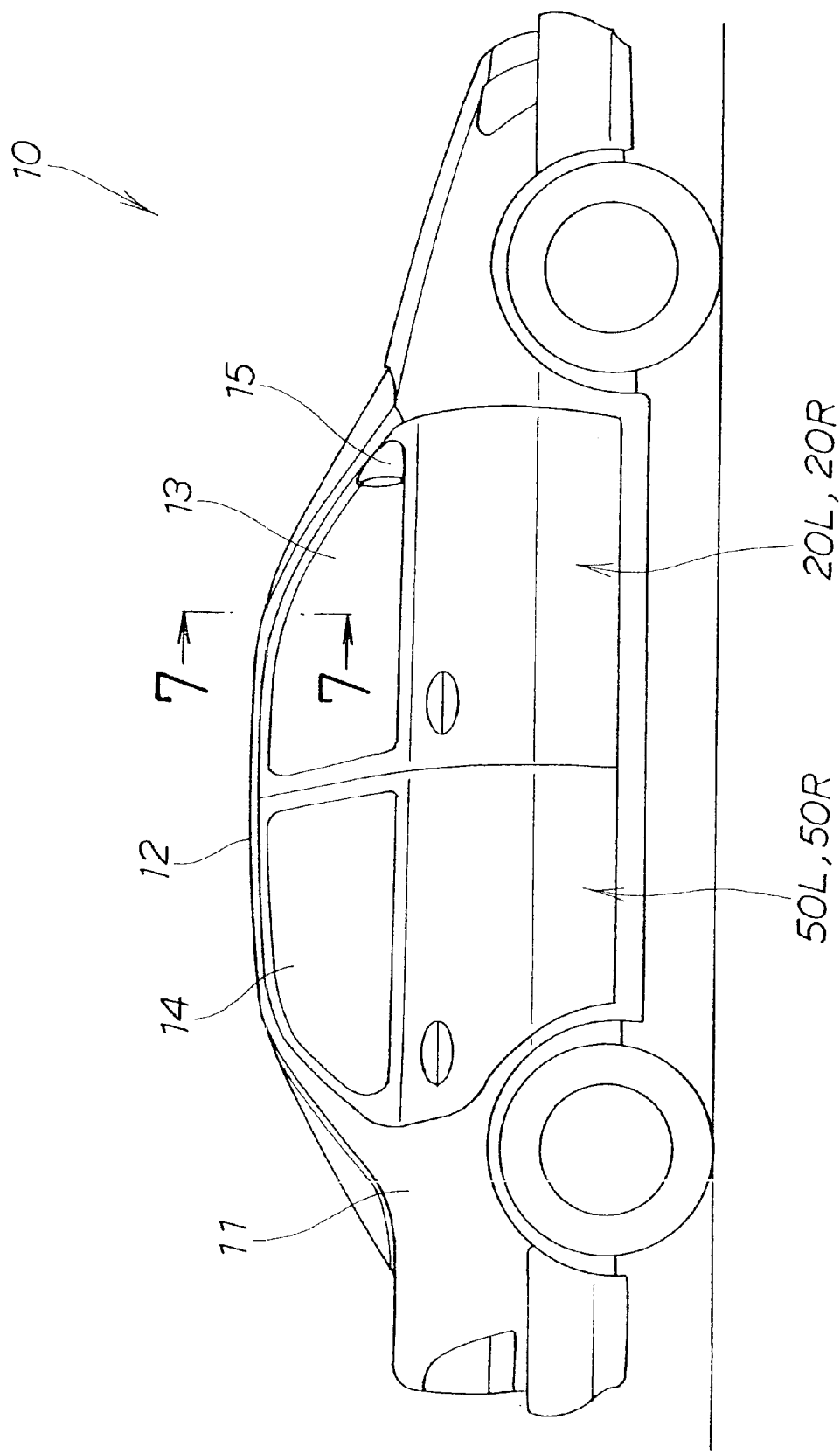
FIG. 1 is a side elevation view of an automobile employing a molding attachment structure according to the present invention.

Referring to FIG. 1, a four-door automobile 10 includes a body 11. The body 11 includes right and left front doors 20R, 20L and right and left rear doors 50R, 50L. The right and left front doors 20R, 20L have the same construction except that they are positioned in symmetric relation to each other. Likewise, the right and left rear doors 50R, 50L are provided in symmetric relation to each other, and are identical in construction to each other. The body 11 includes a roof 12 and a door miller 15. Each of the doors 20R, 20L includes a door glass 13 while each of the doors 50R, 50L includes a door glass 14.

Figure 2:
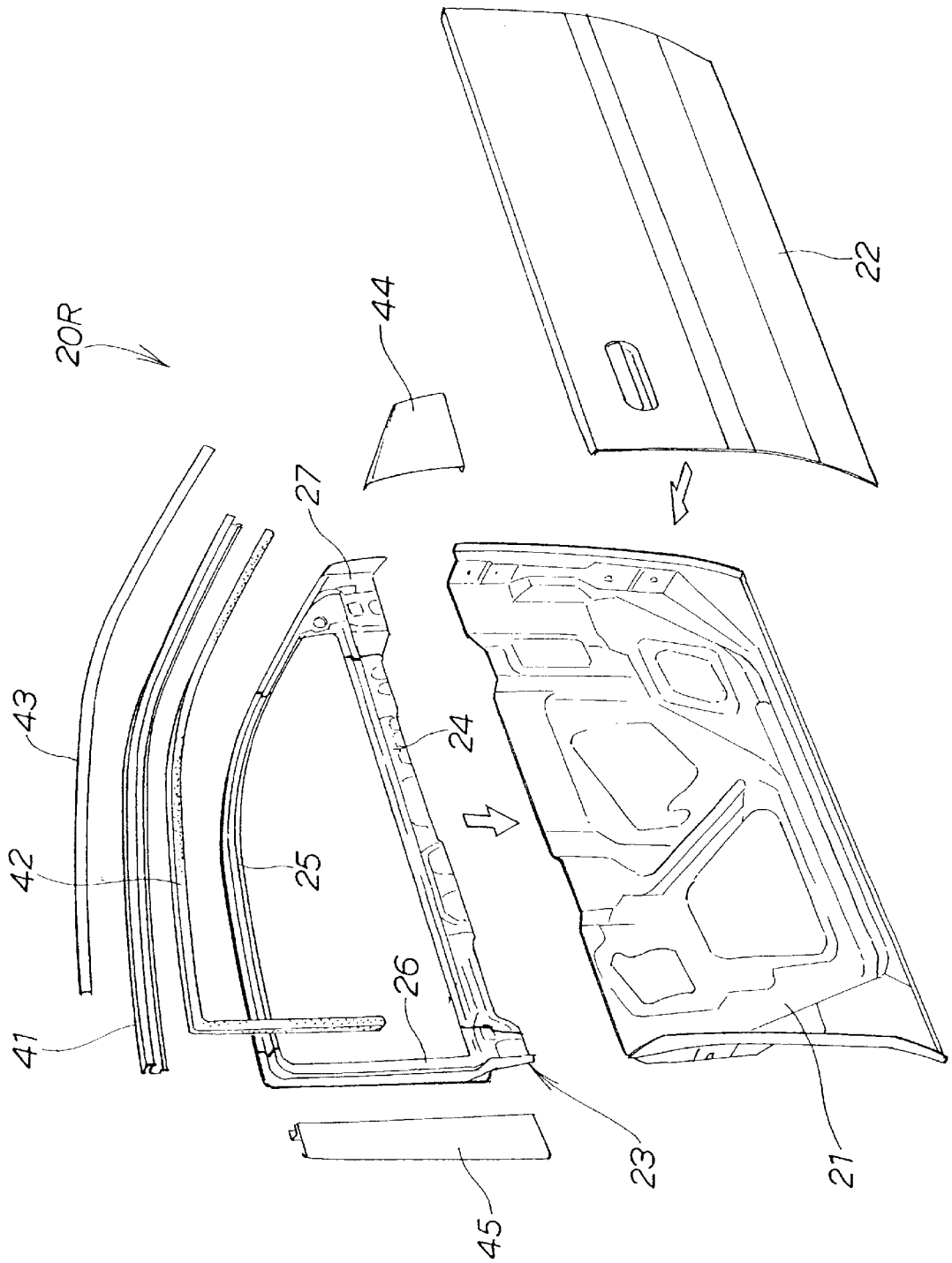
FIG. 2 is an exploded view of a front right door of the automobile of FIG. 1.

Turning to FIG. 2, the door 20R includes a door inner panel 21 and a door outer panel 22 joined to the door inner panel 21. The door inner panel 21 has a sash 23 joined to an upper part thereof. The sash 23 has an outer sash 41 provided externally thereof. The outer sash 41 has a glass run channel 42 and a molding 43 provided externally thereof.

The door inner panel 21 and the door outer panel 22 are made by press forming. The door glass 13 (shown in FIG. 1) is mounted in the sash 23 in such a manner as to be raised and lowered. Reference numerals 44, 45 denote an outer front panel and an outer pillar panel.

Figure 3:
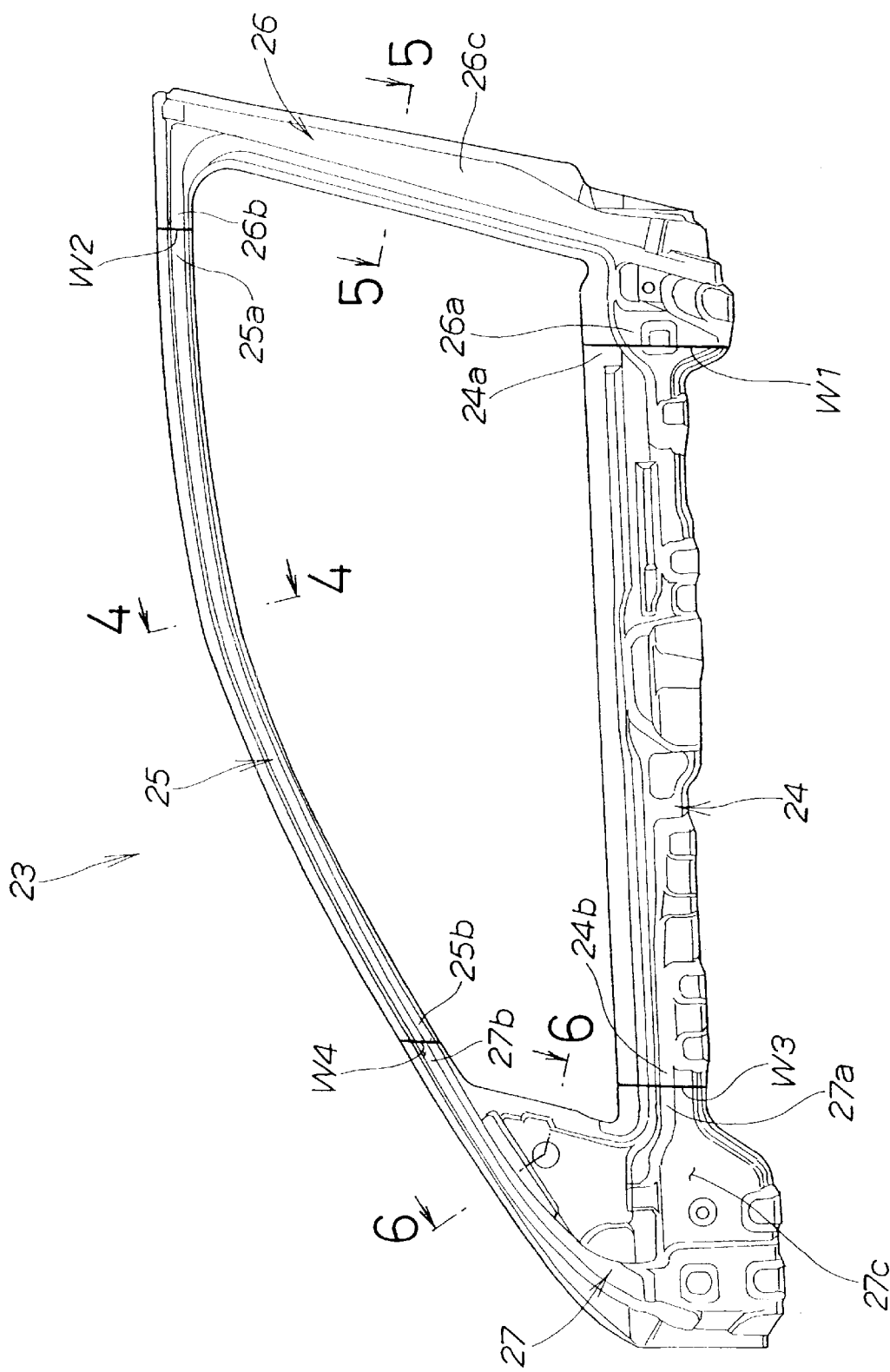
FIG. 3 is a side elevation view of the front right door as viewed from inside the automobile.

With respect to FIG. 3, there is shown the sash 23 of the right front door 20R as viewed from within a passenger compartment of the automobile.

The sash 23 includes a lower frame portion 24 to be mounted on the door inner panel 21. The lower frame portion 24 is oriented horizontally. The sash 23 includes an upper frame portion 25 positioned above the lower frame portion 24. The sash 23 further includes front and rear frame portions 27, 26. The rear frame portion 26 is connected to both a rear end 24a of the lower frame portion 24 and a rear end 25a of the upper frame portion 25. The front frame portion 27 is connected to both a front end 24b of the lower frame portion 24 and a front end 25b of the upper frame portion 25.

The lower frame portion 24 is elongated in a front-and-rear direction of the automobile 11. The upper frame portion 25 extends obliquely downwardly from the rear frame portion 26 to the front frame portion 27. The rear frame portion 26 is elongated vertically. The front frame portion 27 is shorter than the rear frame portion 26.

The sash 23 is made as follows. Plural sheet members, i.e., upper, lower, front and rear sheet members are joined together and subsequently subjected to press forming to thereby provide the sash 23. The sash 23 thus obtained provides a better yield than a sash made by press-forming a relatively large-sized sheet member. The sash 23 thus obtained is cheaper.

The rear frame portion 26 is of generally C-shaped configuration as viewed inside elevation. The rear frame portion 26 includes lower and upper front ends 26a, 26b projecting forwardly. The lower front end 26a is joined to the rear end 24a of the lower frame 24 along a joining line W1. The upper front end 26b is joined to the rear end 25a of the upper frame portion 25 along a joining line W2.

The front frame portion 27 is of generally C-shaped configuration as viewed in side elevation. The front frame portion 27 includes lower and upper rear ends 27a, 27b projecting rearwardly. The lower rear end 27a is joined to the front end 24b of the lower frame portion 24 along a joining line W3 while the upper rear end 27b is joined to the front end 25b of the upper frame portion 25 along a joining line W4.

Figure 4:
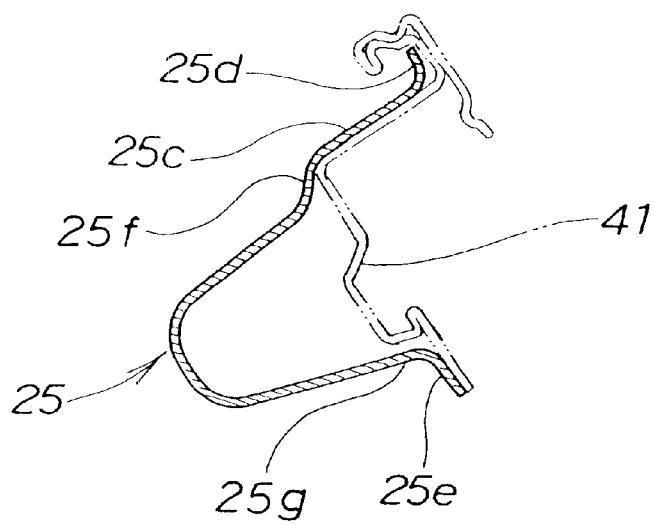
FIG. 4 is a cross-sectional view taken along line 4—4 of FIG. 3.

Reference is made to FIG. 4. The upper frame portion 25 is generally U-shaped in cross-section, and is opened towards outside the body 11. The upper frame portion 25 includes a U-shaped portion having an extension portion 25c projecting outwardly from an upper edge 25f thereof. The extension portion 25c has a first flange 25d formed at an edge thereof. The U-shaped portion includes a second flange 25e formed at a lower edge 25g thereof. The upper frame portion 25 has the outer sash 41 (shown by double-dot-and-dash lines) provided externally thereof.

Figure 5:
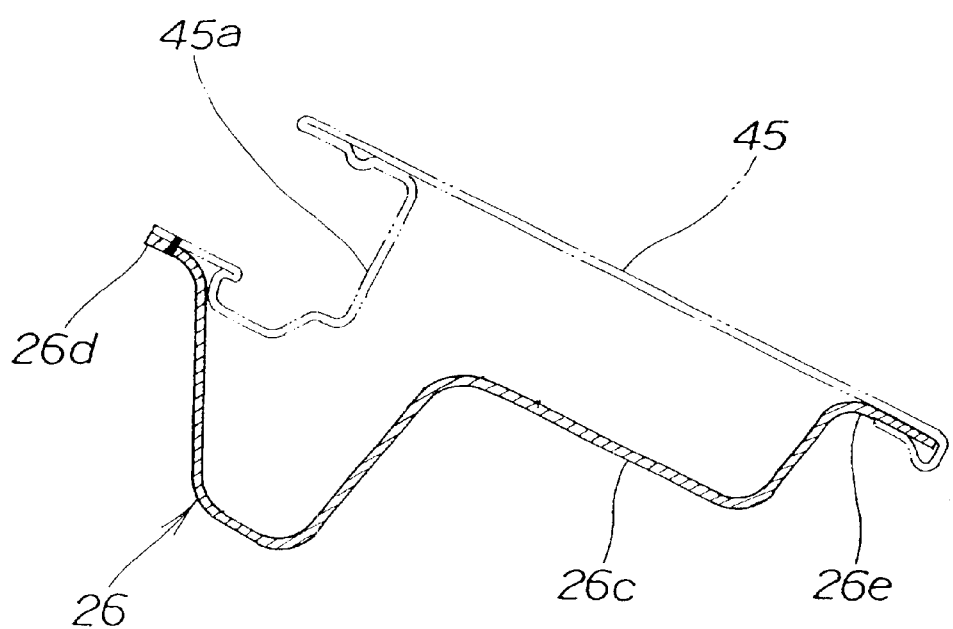
FIG. 5 is a cross-sectional view taken along line 5—5 of FIG. 3.

In relation to FIG. 5, there is shown the rear frame portion 26. The rear frame portion 26 is generally U-shaped in cross-section, and is opened towards outside the body 11.

The rear frame portion 26 includes a U-shaped portion continuous with a flat extension portion 26c extending (rightwardly in this figure) towards a center pillar of the body 11. The rear frame portion 26 has first and second flanges 26d, 26e integrally formed with side edges thereof. The rear frame portion 26 has an outer pillar panel 45 (shown by double-dot-and-dash lines) provided externally thereof. The outer pillar panel 45 includes a holder portion 45a to which the grass run channel 42 (see FIG. 2) is mounted.

Figure 6:
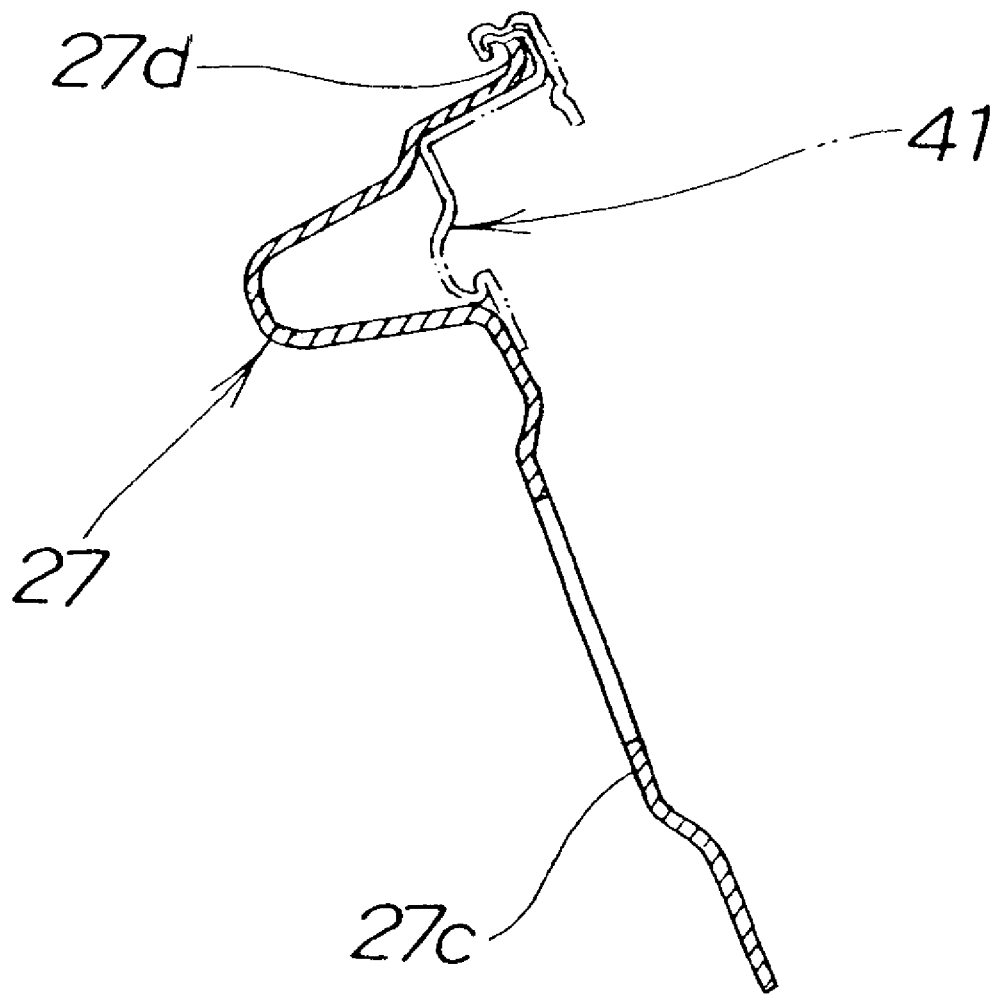
FIG. 6 is a cross-sectional view taken along line 6—6 of FIG. 3.

Referring to FIG. 6, the front frame portion 27 is generally U-shaped in cross-section, and is opened to outside the body 11. The front frame portion 27 includes a U-shaped portion having a flat extension portion 27c extending downwardly therefrom. The U-shaped portion has a flange 27d formed integrally with an upper edge thereof. The front frame portion 27 has the outer sash 41 (shown by double-dot-and-dash lines) provided externally thereof.

A molding mounting structure will be described hereinbelow with reference to FIG. 7 through FIG. 9.

Figure 7:
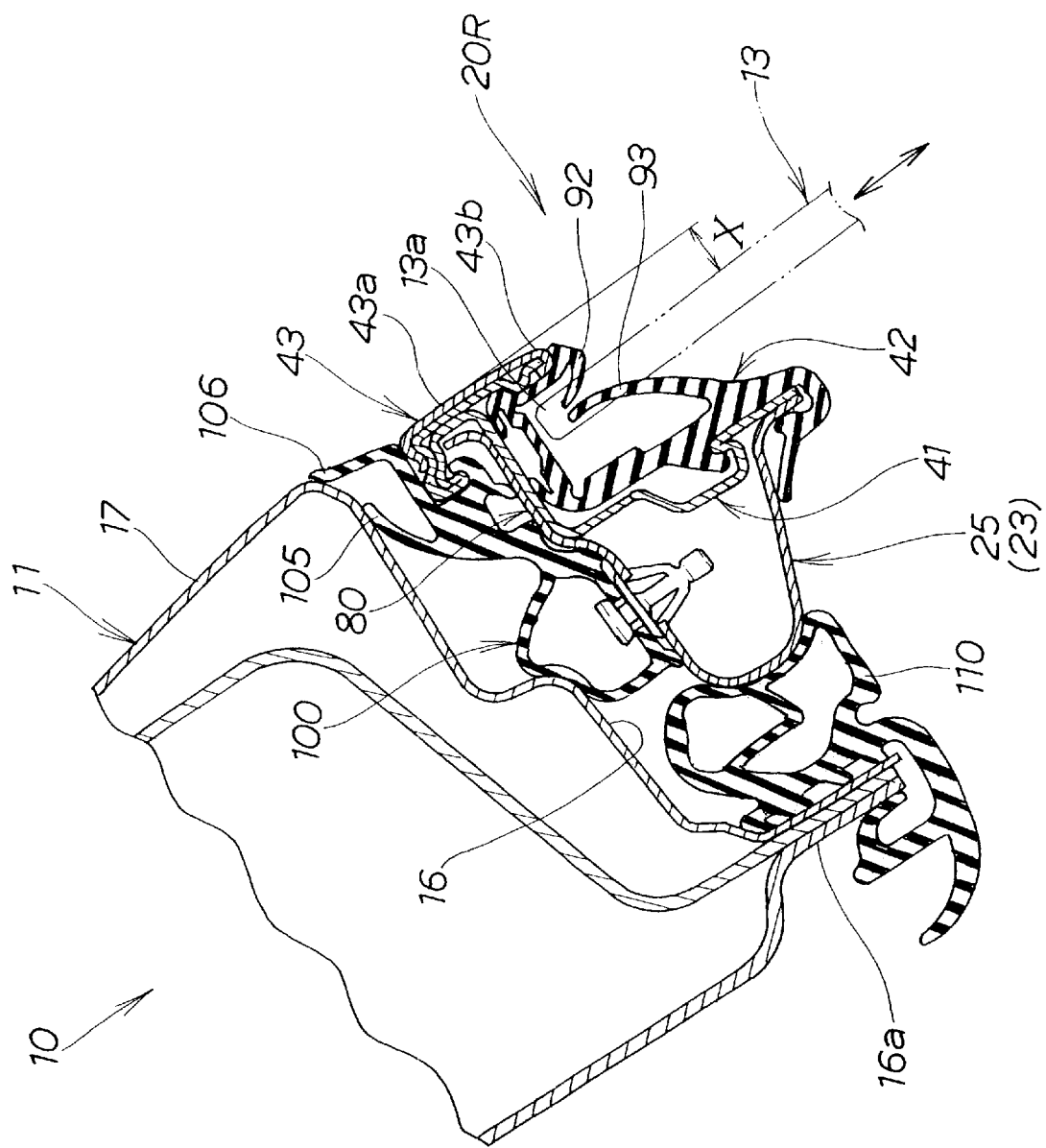
FIG. 7 is a cross-sectional view taken along line 7—7 of FIG. 1, showing the front right door in a closed position.

FIG. 7 illustrates the front door 20R held in a fully closed position. The door 20R is positioned within a door opening portion 16.

The outer sash 41 is provided outside the sash 23 (i.e., the outer sash 41 is positioned rightwardly of the sash 23 in this figure). The outer sash 41 includes a molding attachment part 80 projecting outwardly therefrom. The molding attachment part 80 has a molding 43 mounted to an outer surface thereof. The molding attachment part 80 has a generally T-shaped cross-section.

The door 20R is mounted to the body 11 via a hinge (not shown). The door glass 13 is in a fully closed position. The molding 43 has its outer surface 43a substantially flush with an outer surface 17 of the body 11. The molding 43 overlaps the door glass 13. More specifically, the molding 43 has a side end 43b covering or lying over an edge 13a of the door glass 13 held in the fully closed position as shown by a double-dot-and-dash line.

This makes it possible to provide an improved outer appearance of the automobile 10. Additionally, the automobile 10 runs undergoing a reduced air resistance to thereby produce a reduced hiss.

Figure 8A:
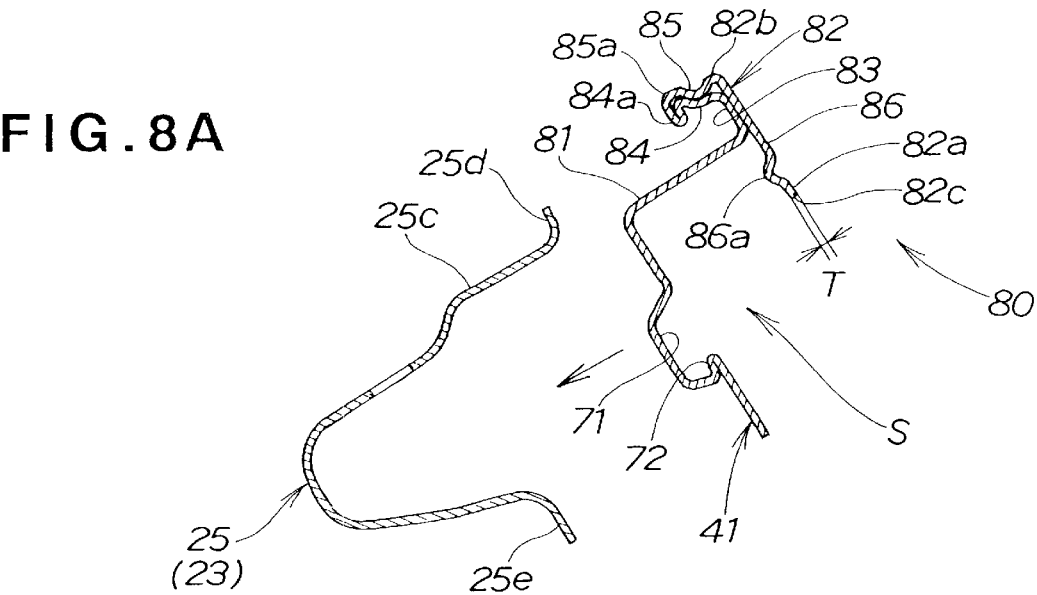
FIG. 8A is a view showing how a sash and an outer sash of the molding attachment structure are mounted to each other.

Turning to FIG. 8A, the sash 23 is shown as being separated from the outer sash 41. The outer sash 41 and the molding attachment part 80 integral with the outer sash 41 are elongated in a direction perpendicular to this drawing sheet and are made by: (1) providing a sheet member; and (2) subjecting the sheet member to roll bending.

The outer sash 41 is to be mounted to the upper frame portion 25 to close an opening defined by the U-shaped portion of the upper frame portion 25. The outer sash 41 includes a recessed portion 71. The recessed portion 71 has an engagement projecting portion 72 formed integrally with one edge thereof.

The molding attachment part 80 includes an extension part 81 extending outwardly from an upper edge of the outer sash 41. The molding attachment part 80 further includes an edge part 82 having a first portion extending (obliquely upwardly in this figure) perpendicularly to the extension portion 81. The first portion extends from a distal end of the extension part 81 away from the door glass 13. The first portion has its distal end bent or folded back. The edge part 82 also has a second portion extending from the bent distal end across the extension part 81 towards the door glass 13.

More specifically, the edge part 82 includes a straight portion 83 (the aforementioned first portion) extending from an edge of the extension part 81 in a direction away from the door glass 13. The straight portion 83 is perpendicular to the extension part 81. The straight portion 83 has a first erected portion 84 projecting a small distance from an edge thereof towards the outer sash 41. The first erected portion 84 is in parallel to the extension part 81. The first erected portion 84 has its edge 84a bent or folded back to extend in parallel to the straight portion 83. The bent edge 84a is continuous with a second erected portion 85 lying on an outer surface of the first erected portion 84. The second erected portion 85 extends outwardly from the edge 84a. In other words, the first erected portion 84 and the second erected portion 85 cooperate with each other to provide the distal end of the first portion as described above. The second erected portion 85 has an edge body 86 (the aforementioned second portion) extending therefrom. More specifically, the edge body 86 extends along an outer surface of the straight portion 83 across the extension portion 81 towards the door glass 13.

The edge body 86 has its edge 82a positioned closely to the door glass 13. The edge 82a has its thickness T corresponding to that of a single sheet.

The second erected portion 85 has a portion 85a projecting outwardly from an outer surface thereof. The edge body 86 has a portion 86a projecting inwardly from an inner surface thereof.

The edge part 82 has edges 82b, 82c positioned at opposite sides thereof. These edges 82b, 82c serve as side edges of the edge body 86.

Figure 8B:
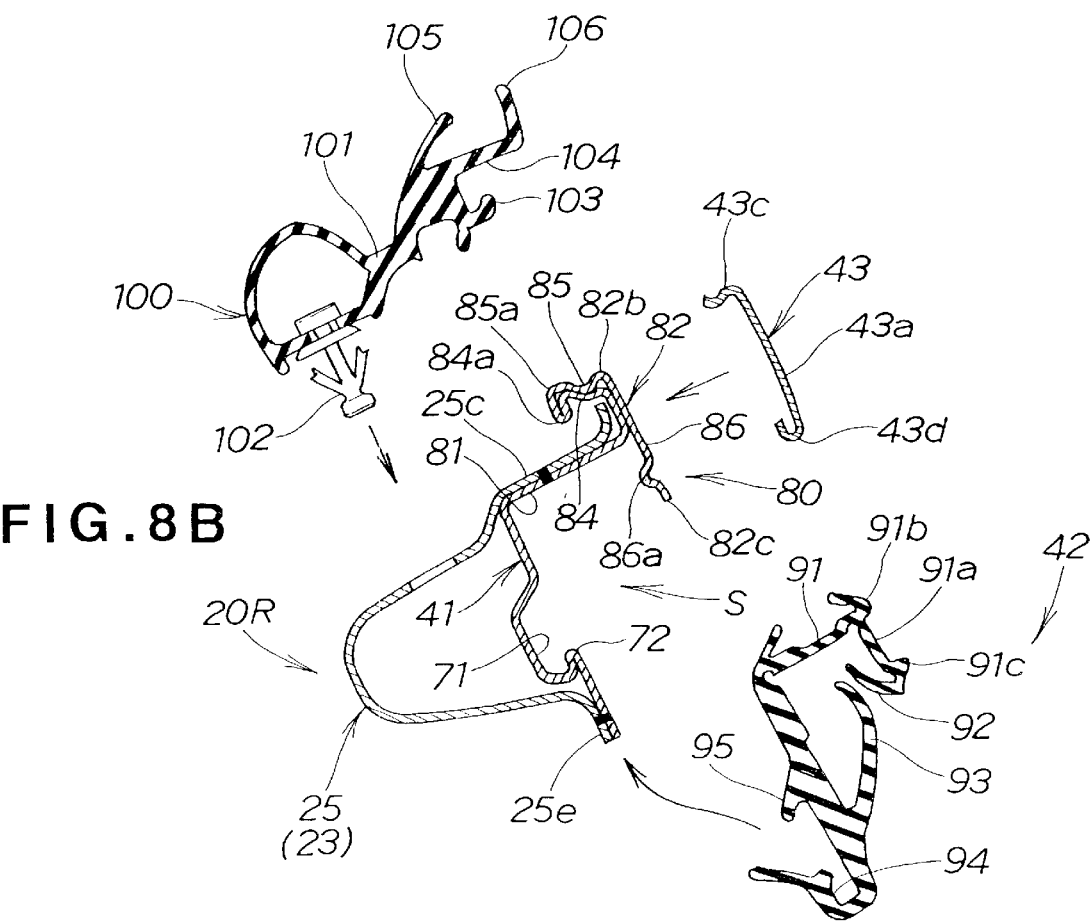
FIG. 8B is a view showing how a molding and elastic members are mounted to the outer sash attached to the sash.

Turning to FIG. 8B, the outer sash 41 is shown covering the upper frame portion 25 to close the opening defined by the U-shaped portion of the upper frame portion 25. The outer sash 41 is attached to the sash 23 with the second flange 25e joined to an edge of the outer sash 41 and with the extension portion 25c joined to the extension portion 81.

The molding 43 is a decorative or ornamental member elongated in a direction perpendicular to this drawing sheet. The molding 43 has its opposite side edges bent inwardly or folded back to provide hook portions 43c, 43d. The molding 43 is C-shaped in cross-section. The molding 43 is made of metal sheet such as stainless steel or aluminum alloy sheet capable of reflecting light. For attachment to the molding attachment part 80 from outside the former, as indicated by an arrow, the molding 43 is laid over an outer surface of the edge part 82 to bring the hook portions 43c, 43d into engagement with the edges 82b, 82c, respectively.

Because the molding 43 serves to reflect light, the former helps decorate the automobile 10 to thereby provide an improved outer appearance of the automobile 10.

The glass run channel 42 is arranged to guide the door glass 13 thereover. The glass run channel 42 serves as a seal member, and is in sealing engagement with the door glass 13. The glass run channel 42 includes a glass run channel body 91, lips 92, 93 projecting into a space defined by the body 91, a fitting portion 94, and a hook portion 95. The lips 92, 93, the fitting portion 94 and the hook portion 95 are formed integrally with the body 91. The glass run channel 42 is made from elastic material such as rubber or other soft resin.

The glass run channel body 91 is to be fitted into a space S defined by the outer sash 41, the extension portion 81, and the edge body 86. The body 91 is generally inverted-U-shaped in cross-section. The lips 92, 93 is arranged to guide the door glass 13 thereover, maintaining a sealing engagement with the latter.

The fitting portion 94 is arranged such that the edge of the outer sash 41 and the second flange 25e joined together are to be pressed there into, as shown by a narrow. The hook portion 95 is to engage the engagement projecting portion 72.

The body 91 has a press surface 91a facing towards the inner surface of the edge body 86. In other words, the press surface 91a is in parallel to the edge body 86. The press surface 91a includes first and second engagement projecting portions 91b, 91c provided at opposite edges thereof. The portions 91b, 91c are integral with the body 91.

As the glass run channel body 91 is fitted into the space S, the engagement projecting portion 91b engages the projecting portion 86a while the hook portion 95 engages the engagement projecting portion 72. The glass run channel body 91 thus arranged is unlikely to accidentally come out of the space S. It thus becomes possible to mount the glass run channel 42 to the respective ones of the sash 23, the outer sash 41, and the molding attachment part 80.

A weatherstrip 100 is to be mounted on an outer surface of the sash 32. The weatherstrip 100 is provided for sealing a space between the door opening portion 16 and the door 20R. The weather strip 100 has a press surface 104 formed thereon. The weatherstrip 100 includes a strip body 101, an engagement portion 103, and seal lips 105, 106. The engagement portion 103 and the seal lips 105, 106 are formed integrally with the strip body 103. The weatherstrip 100 is made from elastic material such as rubber or other soft resin.

The strip body 101 is to be attached to the upper frame portion 25 via a clip 102, as shown by an arrow. The engagement portion 103 projects into engagement with the bent edge 84a of the first erected portion 84. The press surface 104 extends outwardly from the strip body 101 substantially along the second erected portion 85. The press surface 104 faces towards the outer surface of the second erected portion 85. The seal lips 105, 106 project from the strip body 101 for sealing engagement with the door opening portion 16 when the door 20R is in the closed position as shown in FIG. 7.

This makes it possible to mount the weatherstrip 100 to the respective ones of the sash 23, the outer sash 41, and the molding attachment part 80.

Figure 9:
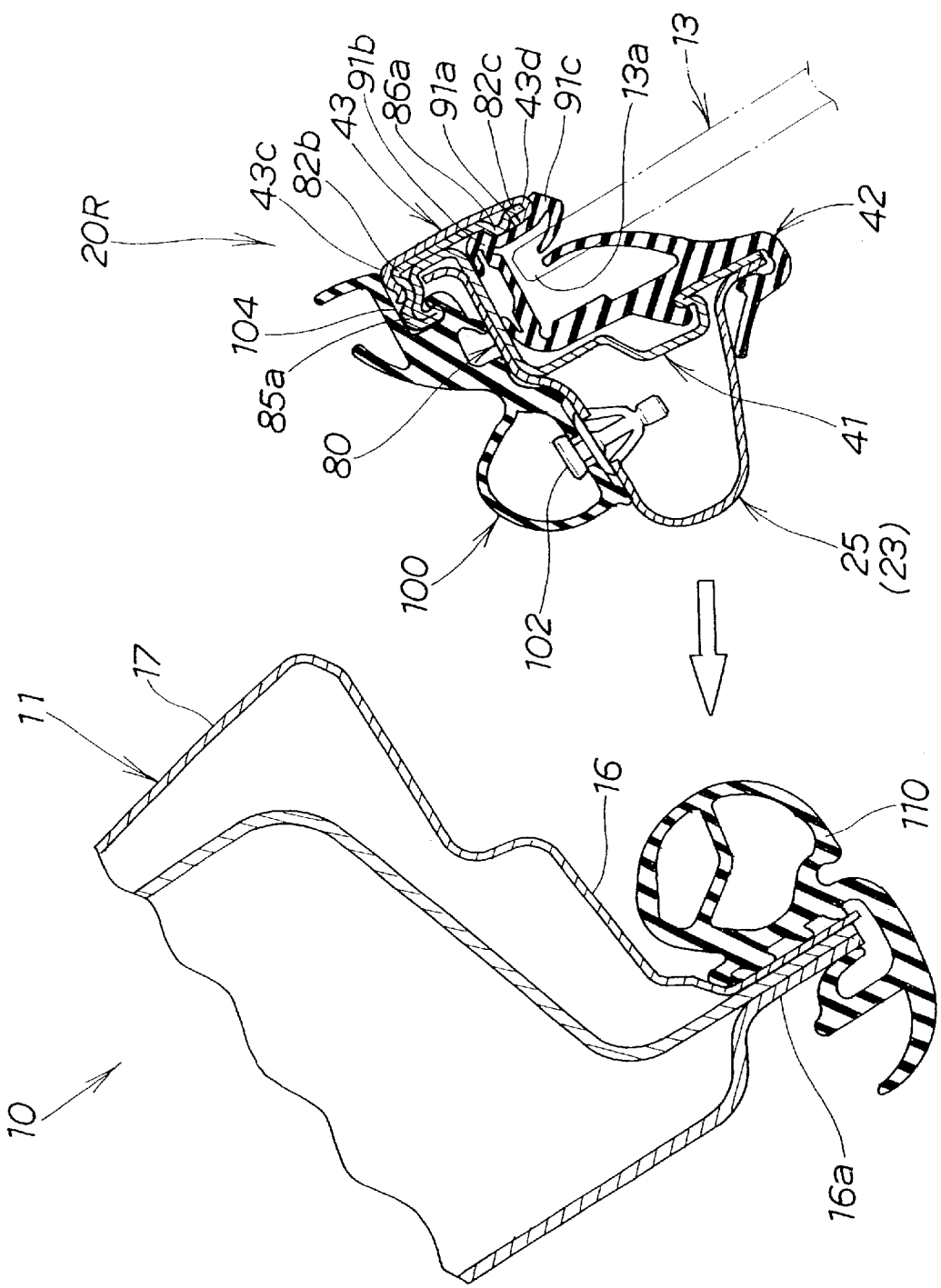
FIG. 9 is the view of FIG. 7 with the front right door in an opened position.

Reference is made to FIG. 9. The front door 20R is shown as being in an opened position.

The elastic members, i.e., the glass run channel 42 and the weatherstrip 100 are mounted to the respective ones of the sash 23, the outer sash 41, and the molding attachment part 80. The weatherstrip 100 and the glass run channel 42 thus mounted press the hook portions 43c, 43d against the edges 82b, 82c of the edge part 82.

With respect to FIG. 8B and FIG. 9, the press surface 91a and the second engagement projecting portion 91c force the hook portion 43d of the molding 43 against the edge 82c.

Likewise, the press surface 104 forces the hook portion 43c of the molding 43 against the edge 82b.

With this arrangement, the molding 43 is securely mounted to the molding attachment part 80.

The projecting portion 85a of the second erected portion 85 is provided proximate the edge 82b engaging the hook portion 43c. The projecting portion 85a is substantially flush with the hook portion 43c. More specifically, the projecting portion 85a has its outer surface substantially flush with an outer surface of the hook portion 43c. With the weatherstrip 100 pressing the hook portion 43c against the edge 82b, the press surface 104 is pressed against the projecting portion 85a as well as against the hook portion 43c.

The projecting portion 86a is provided proximate the edge 82c engaging the hook portion 43d. The projecting portion 86a is substantially flush with the hook portion 43d. More specifically, the projecting portion 86a has its inner surface substantially flush with an outer surface of the hook portion 43d. With the glass run channel 42 pressing the hook portion 43d against the edge 82c, the press surface 91a is pressed against the projecting portion 86a as well as against the hook portion 43d.

As discussed above, the projecting portions 85a, 86a are provided in the proximity of the edges 82b, 82c engaging the hook portions 43c, 43d. The projecting portions 85a, 86a have their surfaces lying in substantially the same plane as the outer surfaces of the hook portions 43c, 43d.

When the elastic glass run channel 42 presses the hook portion 43d against the edge 82c while the elastic weatherstrip 100 presses the hook portions 43c against the edge 82b, the press surface 91a is pressed against the projecting portion 86a as well and the press surface 104 is pressed against the projecting portion 85a as well.

Since the glass run channel 42 is pressed against both the hook portion 43d and the projecting portion 86a while the weatherstrip 100 is pressed against both the hook portion 43c and the projecting portion 85a, the molding 43 is attached to the part 80 with increased firmness.

The elastic members 42, 100 are held in intimate or tight contact with the hook portions 43d, 43c, respectively. Namely, no gap is formed between the elastic member 42 and the hook portion 43d and between the elastic member 100 and the hook portion 43c. This arrangement provides improved outer appearance of the door 20R.

The door opening portion 16 has a weatherstrip 110 mounted to an edge 16a thereof. The weatherstrip 110 is provided for the purpose of sealing engagement with the upper frame portion 25. When the door 20R is closed, the upper frame portion 25 comes into sealing engagement with the weatherstrip 110, as shown in FIG. 7.

Referring back to FIG. 8A, the edge 82a positioned closely to the door glass 13 has the thickness T corresponding to that of a single sheet.

Turning back to FIG. 7, a distance X between the outer surface 43a and a surface of the door glass 13, more specifically, a distance between the side end 43b and the outer surface of the door glass is relatively small to thereby provide the improved outer appearance of the automobile 10. With this arrangement, the automobile 10 can run undergoing a reduced air resistance. Further, while the automobile 10 runs, the door 20R produces a reduced hiss.

The molding 43 is made of a thin metal sheet to thereby help reduce the distance X.

The present invention has been described as being applied to the door 20R, however, it is applicable to the doors 20L, 50L, 50R.

The molding attachment part 80 may be provided not integrally with but separately from the outer sash 41.

The present disclosure relates to the subject matter of Japanese Patent Application No. 2001-266689, filed Sep. 4, 2001, the disclosure of which is expressly incorporated herein by reference in its entirety.

What is claimed is:

1. A molding attachment structure for a door of an automobile, comprising:
   (A) a sash to be provided on an upper part of a door inner panel of the door;
   (B) a door glass mounted in said sash;
   (C) an outer sash provided outside said sash;
   (D) a molding attachment part of T-shaped cross-section projecting outwardly from said outer sash; and (E) a molding mounted to an outer surface of said molding attachment part;

said molding having an outer surface substantially flush with an outer surface of a body of the automobile, said molding having one side end lying over an edge of said door glass when said door glass is in a fully closed position;

said molding attachment part comprising:
- (a) an extension part extending outwardly from said outer sash; and
- (b) an edge part including a first portion extending from a distal end of said extension part away from said door glass and having a distal end folded back, and a second portion extending from the folded distal end of the first portion across said extension part towards said door glass.

2. A molding attachment structure according to claim 1, wherein said molding includes inwardly folded hook portions at opposite side edges thereof, said edge part having opposite side edges engaging said hook portions.

3. A molding attachment structure according to claim 2, further comprising elastic members attached to said outer sash and said molding attachment part in such a manner as to press said hook portions against said opposite side edges.

4. A molding attachment structure according to claim 3, wherein said elastic members are a glass run channel and a weatherstrip.

5. A molding attachment structure according to claim 2, wherein said edge part includes projecting portions provided proximate said opposite side edges engaging said hook portions, said projecting portions being substantially flush with said hook portions of said molding and being forced against said elastic members.

6. A molding attachment structure according to claim 1, wherein said molding is formed of a metal sheet capable of reflecting light.

7. A molding attachment structure according to claim 6, wherein said metal sheet is made from a stainless steel.

* * * * *